United States Patent [19]

Kisaragi et al.

[11] Patent Number: 5,035,730
[45] Date of Patent: Jul. 30, 1991

[54] MIST RECOVERY APPARATUS WITH TWISTED STRIP INSERTED PIPES

[75] Inventors: Takayasu Kisaragi, Tokyo; Yuichi Shirasaka, Aichi, both of Japan

[73] Assignee: Sumitomo Light Metal Industries, Ltd., Tokyo, Japan

[21] Appl. No.: 540,090

[22] Filed: Jun. 19, 1990

[30] Foreign Application Priority Data

Jun. 23, 1989 [JP] Japan .................... 1-73007[U]

[51] Int. Cl.$^5$ ............................................ B01D 45/16
[52] U.S. Cl. .................................... 55/269; 55/456; 55/457
[58] Field of Search ................ 55/183, 184, 199, 269, 55/447, 456, 457

[56] References Cited

U.S. PATENT DOCUMENTS

| | | | |
|---|---|---|---|
| 582,892 | 5/1897 | Abbott | 55/456 X |
| 818,891 | 4/1906 | Jones et al. | 55/456 X |
| 971,258 | 9/1910 | Dunn | 55/456 X |
| 1,207,962 | 5/1912 | Yardley | 55/456 |
| 1,695,192 | 12/1928 | Kotzebue | 55/456 X |
| 1,773,954 | 8/1930 | Coutant | 55/456 X |
| 2,446,882 | 8/1948 | Morrison | 55/457 X |
| 2,924,296 | 2/1960 | Cook | 55/456 X |
| 3,423,294 | 1/1969 | Sephton | 55/456 X |
| 3,581,477 | 6/1971 | Bell et al. | 55/457 X |
| 4,187,089 | 2/1980 | Hodgson | 55/457 X |

FOREIGN PATENT DOCUMENTS 661079 6/1938 Fed. Rep. of Germany ........ 55/457

Primary Examiner—Robert Spitzer
Attorney, Agent, or Firm—Flynn, Thiel, Boutell & Tanis

[57] ABSTRACT

A mist recovery apparatus recovers a mist of water, oil and the like from an exhaust gas produced in the rolling operation of aluminum plates. The apparatus has a shell provided with upper and lower pipe plates and a plurality of exhaust passing pipes extending between the upper and lower pipe plates and, each pipe having a twisted strip therein. The shell has an upper casing and a lower casing, which are respectively placed above the upper plate and beneath the lower plate. The exhaust gas containing a mist flows through the upper casing, exhaust passing pipes, and the lower casing sequentially. These exhaust passing pipes are cooled by a coolant passing around the pipes, so that the mist is removed from the exhaust gas and recovered. The experimentally suitable ratio of the length (L) of the exhaust passing pipe to the twisting half pitch (P) of the twisting strip is from 8-35.

2 Claims, 2 Drawing Sheets

MIST RECOVERY APPARATUS WITH TWISTED STRIP INSERTED PIPES

BACKGROUND OF THE INVENTION

1. Field of the Invention

The present invention relates to an apparatus for recovering mist from an exhaust gas containing a mist of water, oil, etc.

2. Description of the Prior Art

Heretofore, an exhaust containing a mist of steam, rolling oil and the like, which was produced from a roll coolant when, for example, aluminum plates are rolled, has been treated through, for example, a filter installation as shown in FIG. 5 so as to remove the mist. In detail, the exhaust G containing the mist is supplied through an exhaust line 21 respectively passes through a coarse mesh filter 23, a middle function filter 24, and a high function filter 25, in the filtering chamber 22 and is discharged to the atmosphere from an outlet 26. Flowing through such filters of the filtering chamber 22, the mist is held or kept in respective filters and removed from the exhaust.

According to other filtering mechanisms of the prior art, one type has a plurality of corrugated plates arranged in parallel, through which plates an exhaust gas passes and another, type is of a cyclone type.

In conventional filtering apparatus as shown in FIG. 5, the mist is held and deposited on the meshes of the filters, which gradually the recovery deteriorates of the mist. As a result, when the filter mesh is clogged with the mist, the old and clogged filter must be replaced by a new one. It is apparent that the maintenance cost is high, because the filter is high in price and the work replacing it is laborious. In many cases, since the mist content of the exhaust gas is supersaturated and passes through the filter mesh, there is a risk that the mist is discharged as is to the atmosphere. The size of the conventional mist recovery installation must be large in order to lessen the draught resistance or pressure of air.

Other apparatuses of a corrugated plate type and the cyclone type, respectively have little or poor recovery of the mist.

SUMMARY OF THE INVENTION

In view of the foregoing, it is the purpose of the present invention to provide a mist recovery apparatus having a small size, easy manuverability, and good recovery efficiency.

The purpose above is attained by providing a mist recovery apparatus comprising an upper pipe plate and a lower pipe plate, respectively contained in a shell, and a plurality of exhaust passing pipes, each having a twisted strip arranged therein, wherein the exhaust gas containing the mist of water, oil, etc., passes downward through these exhaust passing pipes so as to separate and recover the mist from the exhaust gas. The inner diameter of the exhaust passing pipe is 25-60 mm, and the twisted strip has an L/P (length of the exhaust passing pipe/twisting half pitch of the twisted strip) of 8-35.

DETAILED DESCRIPTION OF THE PREFERRED EMBODIMENTS

Figure 1:
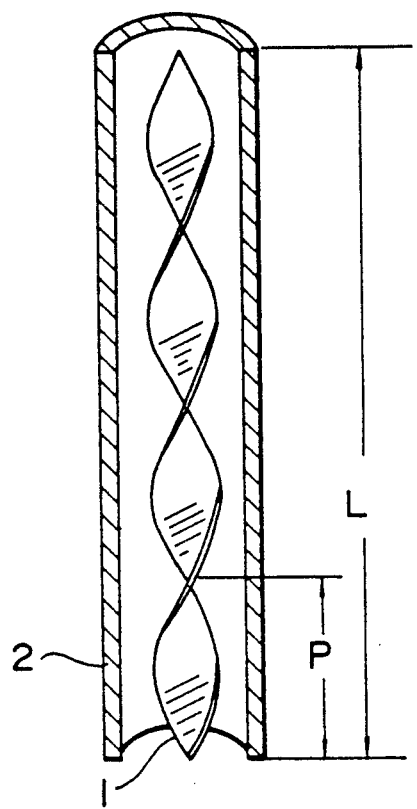
FIG. 1 is a perspective view of the vertical section of the exhaust passing pipe to be used in the mist recovery apparatus according to the present invention.
Figure 2:
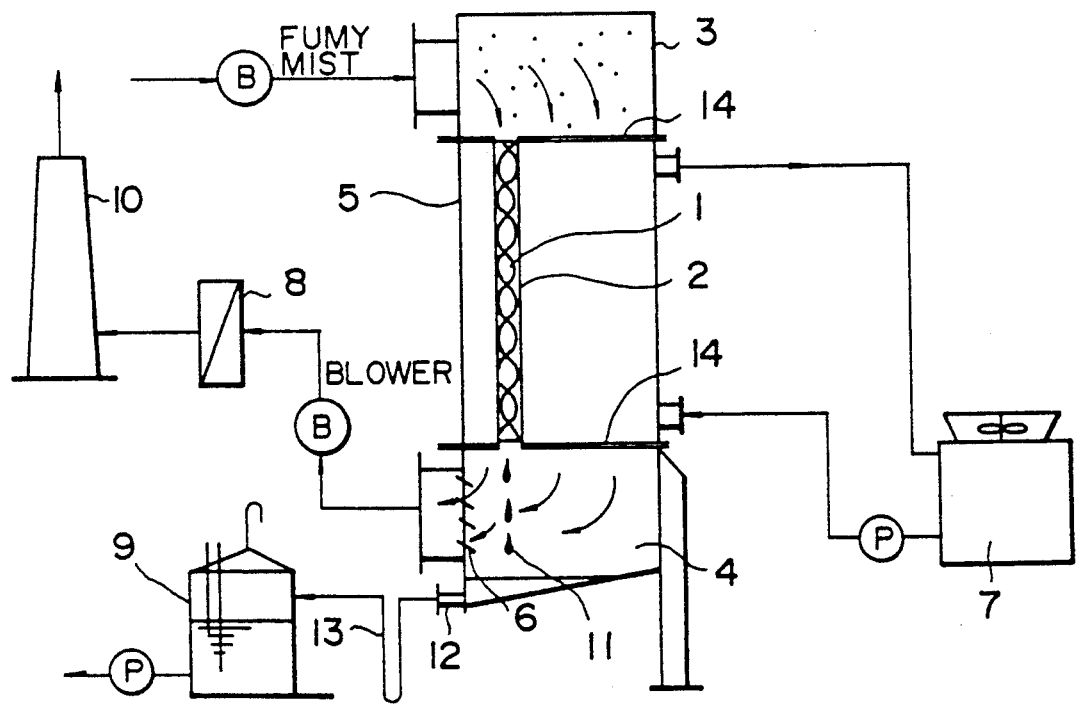
FIG. 2 shows an example of the mist recovery system containing the mist recovery apparatus of the present invention.

First the construction of the exhaust passing pipes according to the present invention will be explained. As shown in FIG. 1 (vertical section), a twisted strip 1 is placed within the exhaust passing pipe 2. A number of the exhaust passing pipes 2 are arranged between the upper and the lower pipe plates 14 within the shell 5 and both ends of each passing pipe 2 pass or penetrate through the pipe plates so as to open to the interiors of an upper casing 3 and a lower casing 4, respectively.

Exhaust gas containing a mist is supplied to the upper casing 3 through a blower B and, then, the exhaust gas flows into the exhaust passing pipes 2 which are open to the interior of the upper casing 3. Flowing through the exhaust passing pipes, the exhaust gas contacts with the twisted strips 1 and the inner walls of the exhaust passing pipes 2 and flows down vertically within the passageway formed by the twisted strip 1 and the inner wall of the exhaust passing pipe 2. The mist is separated from the exhaust gas and deposited on the outer surface of the twisted strip 1 and the inner wall of the exhaust passing pipes 2. The remaining exhaust gas enters the lower casing 4 and flows through a louver 6. After that, the remaining gas is sucked by a blower B and forced into a filter 8 through a conduit connecting the lower casing 4 and the filter 8. In the filter 8, fine mist of, for example, 10 μm or less, is separated from the remaining exhaust gas and, then, the exhaust gas is discharged to the atmosphere through a chimney or a discharging column 10.

Coolant, which is cooled by radiating heat in a cooling tower 7, circulates through the shell 5 in a space provided inside the shell 5 and around the pipes 2 in order to cool the exhaust passing pipes 2 through their outer walls.

Mist deposited or liquid condensed onto the inner wall of the exhaust passing pipes 2 and the surface of the twisted strips 1 within the exhaust passing pipes 2 fall into the lower casing 4 and is recovered. The recovered mist 11 is collected in an oil separator 9 through a drain outlet 12 and a U-shaped tube 13.

Because the exhaust passing pipes 2 of the present invention each have a twisted strip 1 therein and the flow of the exhaust gas becomes a vertical flow while descending through the exhaust passing pipes 2, mist of several μm or more in diameter is effectively removed and saturated stream in the exhaust gas is effectively liquefied and recovered due to the heat transfer acceleration effect of the twisted strip 1.

The twisted strips 1 are made of a metal, such as stainless steel and aluminum alloy or the like, and their outer diameters are a little smaller than the inner diameter of the exhaust passing pipes 2. The twisted strips 1 may be a suspension type so that the twisted strips 1 can be easily removed after a lid of the upper casing 3 is dismantled.

The inner diameter of the exhaust passing pipe 2 and the twisting half pitch P of the twisted strip 1 are important in improving the mist arresting efficiency.

First, preferably, the inner diameter of the exhaust passing pipes 2 is 25-60 mm. If the diameter is less than 25 mm, the resistance to the flow of the mist and the pressure loss increases, so that the number of the exhaust passing pipes 2 to be installed or used in the shell 5 has to be increased, resulting disadvantageously in the enlargement of the shell 5 and the mist recovery apparatus. Also, if the inner diameter of the exhaust passing pipes exceeds 60 mm, it is necessary to lengthen the exhaust passing pipes 2 in order to attain sufficient intimate contact of the mist with the inner wall of the pipe 2, results in large size of the mist recovery apparatus. Therefore, the preferably size of the inner diameter of the pipes 2 is 25-60 mm.

The twisting half pitch P of the twisted strip 1 will be explained with reference to FIG. 3 and FIG. 4.

The exhaust passing pipes of 25 mm and 60 mm in inner diameter are prepared and exhaust gas is passed through them at a speed of 8 m/s. FIG. 3 and FIG. 4 show the relationship between the particle diameter of the mist removed and L/P (the length L of the exhaust passing pipe 2 and a twisting half pitch P of the twisted strip 1).

Figure 3:
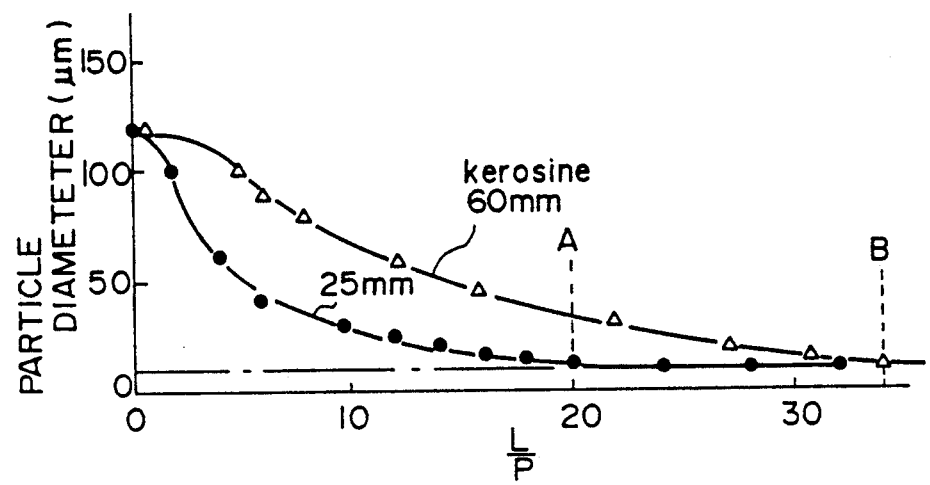
FIGS. 3 and 4 are graphs depicting the relationship between diameters of the particles to be removed and L/P.
Figure 4:
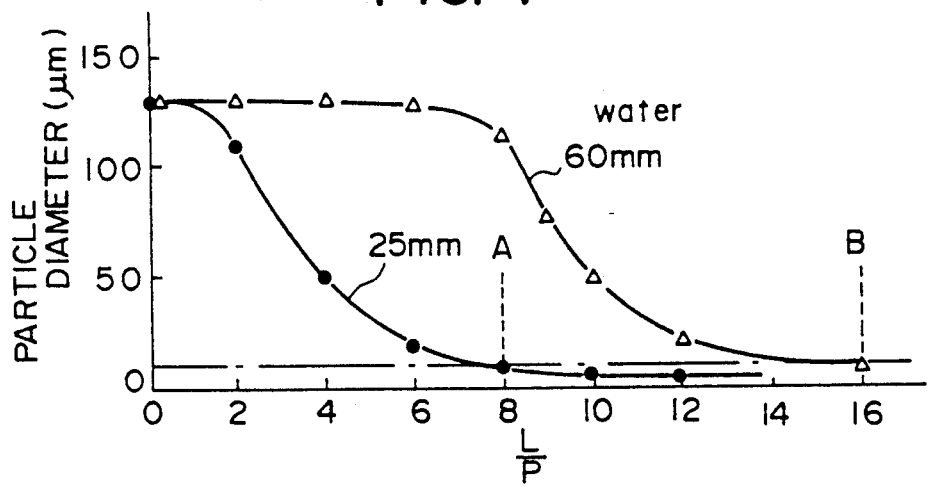
Figure 5:
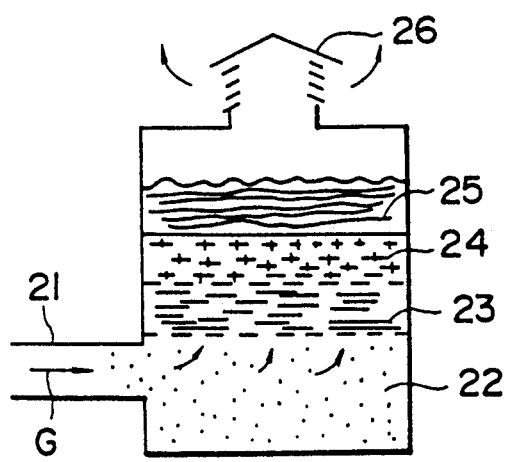
FIG. 5 is a section of the conventional filter apparatus.

FIG. 3 is for a mist of kerosine and FIG. 4 is for a mist of water.

As is apparent from the graphs, an L/P of 20-35 preferably when the mist is kerosine and is suitable when an L/P of 8-16 is water. In general, the mist 8-35 is preferably an L/P of.

As described above, the technical effects to be obtained by embodying the present invention are summarized as follows:

1. The mist contained in the exhaust gas can be recovered effectively at, for example, about a removal efficiency 95%, so that a great pollution prevention effect can be obtained.
2. It is possible to remove elements of the mist and reuse them. From the recovery of kerosine, it is possible to repay the cost of the mist recovery installation for about 1.7 years.
3. The heat transfer efficiency of the exhaust passing pipes is improved and the gas cooling effect increases so that liquifaction of steam in the exhaust is accelerated.
4. Because outer surfaces of the twisted strip are smooth, liquid flows down smoothly and rapidly.
5. Any pollution and dirt sticking on the inner wall of the exhaust passing pipe are washed off.
   (i) Due to the vertical flow on the twisted strip, a great washing effect is obtained.
   (ii) The twisted strips are not secured to the exhaust passing pipes, so that they are easily taken out of the exhaust passing pipes for inspecting and cleaning them.

What is claimed is:

1. A mist recovery apparatus comprising a shell, an upper pipe plate and a lower pipe plate respectively arranged in said shell, and a plurality of exhaust passing pipes, each pipe having a twisted strip placed therein, wherein an exhaust gas containing the mist is passed downward through said exhaust passing pipes so as to separate and recover said mist from said exhaust gas, the inner diameter of said exhaust passing pipe being 25-60 mm, and said twisted strip having a ratio of L/P (length of said exhaust passing pipe/twisting half pitch of said twisted strip) of 8-35.

2. A mist recovery apparatus as claimed in claim 1 in which said mist recovery apparatus includes a space provided in said shell and around said pipes and a cooling tower adapted to cool a coolant to be circulated through said space so as to cool said exhaust passing pipes.

* * * * *

REEXAMINATION CERTIFICATE (2240th)
United States Patent [19]
Kisaragi et al.

[11] B1 5,035,730
[45] Certificate Issued Mar. 8, 1994

[54] MIST RECOVERY APPARATUS WITH TWISTED STRIP INSERTED PIPES

[75] Inventors: Takayasu Kisaragi, Tokyo; Yuichi Shirasaka, Aichi, both of Japan

[73] Assignee: Sumitomo Light Metal Industries, Ltd., Tokyo, Japan

Reexamination Request:
No. 90/002,962, Jan. 25, 1993

Reexamination Certificate for:
Patent No.: 5,035,730
Issued: Jul. 30, 1991
Appl. No.: 540,090
Filed: Jun. 19, 1990

[30] Foreign Application Priority Data

Jun. 23, 1989 [JP] Japan .................... 1-73007

[51] Int. Cl.$^5$ .................................... B01D 45/16
[52] U.S. Cl. ........................ 55/269; 55/456; 55/457
[58] Field of Search .............. 55/183, 184, 199, 269, 55/447, 456, 457

[56] References Cited

U.S. PATENT DOCUMENTS

| | | | |
|---|---|---|---|
| 582,892 | 5/1897 | Abbott | 55/456 X |
| 818,891 | 4/1906 | Jones et al. | 55/456 X |
| 971,258 | 9/1910 | Dunn | 55/456 X |
| 1,207,962 | 5/1912 | Yardley | 55/456 |
| 1,246,583 | 11/1917 | Fulweiler | |
| 1,695,192 | 12/1928 | Kotzebue | 55/456 X |
| 1,773,954 | 8/1930 | Coutant | 55/456 X |
| 2,446,882 | 8/1948 | Morrison | 55/457 X |
| 2,924,296 | 2/1960 | Cook | 55/456 X |
| 3,421,351 | 1/1969 | Newman et al. | 72/64 |
| 3,423,294 | 1/1969 | Sephton | 55/456 X |
| 3,581,477 | 6/1971 | Bell et al. | 55/457 X |
| 4,038,056 | 7/1977 | Diachuk | 55/238 |
| 4,043,774 | 8/1977 | McGrath | 55/269 |
| 4,134,908 | 1/1979 | Steiner et al. | 260/449.6 M |
| 4,187,089 | 2/1980 | Hodgson | 55/457 X |
| 4,280,825 | 7/1981 | Marjollet et al. | 55/203 |
| 4,364,754 | 10/1982 | Diachuk | 55/269 |
| 4,382,807 | 10/1983 | Diachuk | 55/269 |
| 4,516,994 | 5/1985 | Kocher | 55/337 |

FOREIGN PATENT DOCUMENTS 661079 6/1938 Fed. Rep. of Germany ........ 55/457

OTHER PUBLICATIONS

Gambill, W. R., et al. "Heat Transfer, Burn-out and Pressure Drop for Water in Swirl Flow Tubes with Internal Twisted Tapes", Chem. Eng. Prog. Symp. Ser. vol. 57, No. 32, pp. 127–137, 1961.

Royal, J. H. et al., "Pressure Drop and Performance Evaluation of Augmented In-Tube Condensation":, Heat Transfer 1978, Proc. of the Sixth Int'l Heat Transfer Conf., vol. 2, pp. 459–464, 1978.

Luu, M. et al., "Experimental Study of the Augmentation of In-Tube Condensation of R-113", ASHRAE Trans. vol. 85, Part 2, pp. 132–145, 1979.

*Primary Examiner*—Tim R. Miles

[57] ABSTRACT

A mist recovery apparatus recovers a mist of water, oil and the like from an exhaust gas produced in the rolling operation of aluminum plates. The apparatus has a shell provided with upper and lower pipe plates and a plurality of exhaust passing pipes extending between the upper and lower pipe plates and, each pipe having a twisted strip therein. The shelll has an upper casing and a lower casing, which are respectively placed above the upper plate and beneath the lower plate. The exhaust gas containing a mist flows through the upper casing, exhaust passing pipes, and the lower casing sequentially. These exhaust passing pipes are cooled by a coolant passing around the pipes, so that the mist is removed from the exhaust gas and recovered. The experimentally suitable ratio of the length (L) of the exhaust passing pipe to the twisting half pitch (P) of the twisting strip is from 8–35.

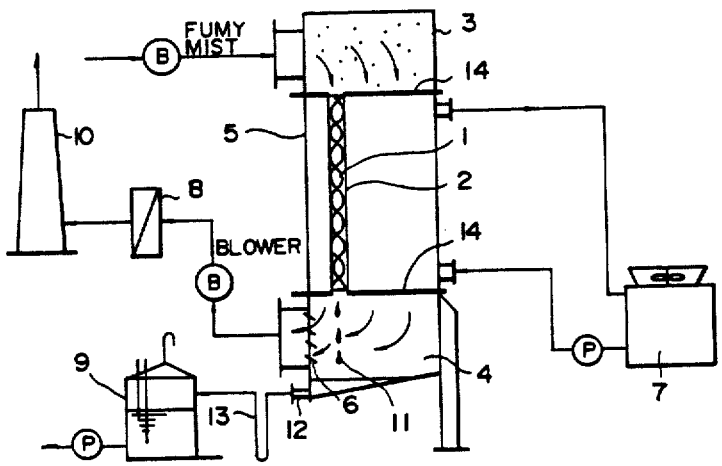

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2 is confirmed.

* * * * *